United States Patent
Dippel et al.

(10) Patent No.: US 12,312,713 B2
(45) Date of Patent: May 27, 2025

(54) RING FOR A RING-SPINNING OR RING-TWISTING MACHINE

(71) Applicant: Bräcker AG, Pfäffikon-Zürich (CH)

(72) Inventors: Markus Dippel, Pfäffikon (CH); Robert Santner, Linz (AT); Hubert Mitterhofer, Linz (AT); Gerald Jungmayr, Traun (AT)

(73) Assignee: Bräcker AG, Pfäffikon-Zürich (CH)

( * ) Notice: Subject to any disclaimer, the term of this patent is extended or adjusted under 35 U.S.C. 154(b) by 0 days.

(21) Appl. No.: 18/258,410

(22) PCT Filed: Dec. 16, 2021

(86) PCT No.: PCT/IB2021/061835
§ 371 (c)(1),
(2) Date: Jun. 20, 2023

(87) PCT Pub. No.: WO2022/137039
PCT Pub. Date: Jun. 30, 2022

(65) Prior Publication Data
US 2024/0035206 A1    Feb. 1, 2024

(30) Foreign Application Priority Data
Dec. 21, 2020   (CH) ........................... 1639/20

(51) Int. Cl.
*D01H 7/58*      (2006.01)
*D01H 1/02*      (2006.01)
(Continued)

(52) U.S. Cl.
CPC ................. *D01H 7/58* (2013.01); *D01H 1/02* (2013.01); *D01H 1/24* (2013.01); *H02K 7/09* (2013.01); *H02K 21/16* (2013.01)

(58) Field of Classification Search
CPC .. D01H 1/02; D01H 1/24; D01H 7/58; H02K 7/09; H02K 21/16
See application file for complete search history.

(56) References Cited

U.S. PATENT DOCUMENTS 3,785,140 A * 1/1974 Muller .................... D01H 7/58
57/119
3,851,448 A * 12/1974 Sano ...................... D01H 7/565
57/75

(Continued)

FOREIGN PATENT DOCUMENTS

CN      108 301 078 A      7/2018
CN      208 266 341 U      12/2018
(Continued)

OTHER PUBLICATIONS

PCT Search Report, Feb. 25, 2022.
(Continued)

*Primary Examiner* — Shaun R Hurley
(74) *Attorney, Agent, or Firm* — Dority & Manning, P.A.

(57) ABSTRACT

A driven ring assembly for a ring-spinning or ring-twisting machine includes a ring and an electric drive having a stator and a rotor with a magnet. A ring crown is on the ring and a ring traveler is on the ring crown. A connecting portion is between the ring and the rotor. The electric drive includes coil winding strands in the stator that generate a torque and radial forces. An axial degree of freedom and tilting degrees of freedom of the rotor are passively stabilized by reluctance forces and radial degrees of freedom of the rotor are actively stabilized by a control loop controlling current through the coil winding strands.

15 Claims, 5 Drawing Sheets

(51) Int. Cl.
*D01H 1/24* (2006.01)
*H02K 7/09* (2006.01)
*H02K 21/16* (2006.01)

(56) References Cited

U.S. PATENT DOCUMENTS

| | | | |
|---|---|---|---|
| 4,304,169 A * | 12/1981 | Cimprich | D04C 3/36 |
| | | | 181/290 |
| 4,932,200 A | 6/1990 | Etuya et al. | |
| 5,009,063 A * | 4/1991 | Yamaguchi | D01H 7/58 |
| | | | 57/100 |
| 5,109,659 A * | 5/1992 | Tsuzuki | F16C 35/00 |
| | | | 57/66 |
| 5,237,229 A | 8/1993 | Ohishi | |
| 5,740,666 A | 4/1998 | Yamaguchi et al. | |
| 10,767,285 B2 * | 9/2020 | De Haas | D01H 7/52 |
| 2019/0127892 A1 | 5/2019 | De Haas et al. | |

FOREIGN PATENT DOCUMENTS

| | | | | |
|---|---|---|---|---|
| CN | 109 763 220 A | 5/2019 | | |
| EP | 0 989 315 A1 | 3/2000 | | |
| EP | 2 009 153 A1 | 12/2008 | | |
| EP | 3 255 760 A1 | 12/2017 | | |
| EP | 3595137 A1 * | 1/2020 | | B01F 33/4535 |
| JP | S 61152835 A | 7/1986 | | |
| WO | WO 2004/027129 A2 | 4/2004 | | |

OTHER PUBLICATIONS

High-Speed Drive for Textile Rotor Spinning Applications—IEEE Transactions on industrial electronics, Jun. 1, 2014 IEEE Service Center; vol. 61, Nr:6, pp. 2990-2997; Jun. 1, 2014.

* cited by examiner

RING FOR A RING-SPINNING OR RING-TWISTING MACHINE

FIELD OF THE INVENTION

The invention relates to a ring for a ring-spinning or ring-twisting machine.

BACKGROUND

Rings are used as spinning rings in so-called ring-spinning machines or as twisting rings in so-called twisting machines. The spinning or twisting rings work together with attached ring travelers. The ring travelers, dragged along by the thread held by the ring traveler, rotate at high speeds on an upper side of the spinning rings, the so-called ring crown, which results in high loads on the contact surfaces between the ring traveler and the ring crown of the spinning rings. A web which can end in a foot flange is provided for fastening the spinning or twisting rings in the machine. The ring crown as well as the foot flange, or if the foot flange is missing, the web, are manufactured in a variety of designs, each adapted in shape and geometry to the requirements of the corresponding machine and a provided construction of the fastening means of the spinning or twisting ring. The spinning ring is held in the machine in a so-called ring frame. In the following, spinning rings and twisting rings are summarized under the term spinning ring.

During operation, the friction surfaces between the spinning ring and the ring traveler heat up, and thus also the thread. The rapid rotation of the ring traveler on the spinning ring can result in local temperatures of over 400° C., which set operational limits for the ring traveler-spinning ring system. Due to these mechanical conditions, the ring traveler speeds of more than 30,000 revolutions per minute cannot be exceeded without damage to the ring traveler or the thread. Attempts have been made in the prior art to remedy this situation by means of a rotating spinning ring. The use of a rotating spinning ring reduces the relative speed between the ring traveler and the spinning ring and, as a result, the speed of the ring traveler can be increased compared to a stationary spinning ring without increasing the thermal load on the ring traveler-spinning ring system. By increasing the speed of the ring traveler, the production of the spinning machine can also be increased accordingly.

Various designs of ring traveler-spinning ring systems with rotating rings are known from the prior art. For example, CN 109 763 220 A describes a drive for a spinning ring with a hollow shaft motor. The hollow shaft of the motor fastened to the ring rail is non-rotatably connected to the spinning ring. The ring traveler is held in a free-rotating manner on the ring crown or in a stationary manner on the ring crown. The utility model CN 208 266 341 U also discloses a driven spinning ring, the spinning ring being connected to the rotor of the electric motor and the stator of the electric motor being fastened to the ring rail via a housing of the electric motor. CN 108 301 078 A discloses a driven ring traveler system which allows for a "high-speed operation" of the spinning machine and which is intended to increase the service life of the ring traveler by reducing the relative speed between the spinning ring and ring traveler. An arrangement for the ring traveler-spinning ring system comprises the spinning ring for mounting the ring traveler, the spinning ring being attached on the rotor of the drive. The rotor is held in an outer ring by means of a ball bearing, which is fastened to the ring rail.

The disadvantage of the known designs of driven spinning rings is the bearing thereof. Roller bearings or structures similar to roller bearings are provided in each case for the stabilization of the spinning rings in the radial direction. This mechanical bearing in turn causes heating and a limitation of the speeds due to the mechanical properties of the partner materials in the mechanical bearing.

SUMMARY OF THE INVENTION

An object of the invention is to create a driven ring in which the possibility of increasing the speed is not hindered by mechanically generated frictional heat. Additional objects and advantages of the invention will be set forth in part in the following description, or may be obvious from the description, or may be learned through practice of the invention.

The objects are achieved by the features set forth herein.

A novel drive for a ring for a ring-spinning or ring-twisting machine is proposed, with an electric drive having a stator and a rotor having a magnet, wherein the ring comprises a ring crown for contact with a ring traveler and a connecting portion, and wherein the ring is non-rotatably connected to the rotor of the drive via the connecting portion. The drive has a coil system for generating a torque as well as radial forces, one axial degree of freedom and both tilting degrees of freedom of the rotor being passively stabilized by reluctance forces and both radial degrees of freedom being actively stabilized by a control loop. Drives with coil systems which allow the generation of torques and radial forces are known from the prior art and are referred to in the literature as bearingless motors.

The magnet, which is firmly connected to the rotor, generates an exciter magnetic field. This magnetic field already stabilizes three degrees of freedom passively, i.e. without energizing the coils: These are the axial degree of freedom and the two tilting degrees of freedom. The two radial degrees of freedom are stabilized by suitably energizing the stator coils. In this case, the energizing is adjusted in a control both depending on the radial rotor position and depending on the electrical angle of rotation of the rotor. The radial position (x and y direction) and the electrical angle of rotation of the rotor are continuously recorded by sensors. The necessary coil currents are determined in the control system in order to move the rotor into the force-free position thereof in the x-y plane. The current generated by this control is referred to as the force-current component. The mean value of the force-current component is approximately 0 amperes since the rotor is kept in its force-free position by the control. In addition to the force-current component, the coils are also subjected to a torque-current component. This current component corresponds to the current that a synchronous motor also uses in its operation. For this reason, all control methods known from the field of synchronous motors, such as field weakening to achieve higher speeds, are possible with the bearingless motor.

A bearingless motor can be implemented with a number of strands of less than or equal to four. As is customary in engine technology, each strand can consist of a series connection and/or parallel connection of coils. The individual coils can be arranged concentrically around a pole piece, but an embodiment as a distributed winding is also possible.

Figure 9A:
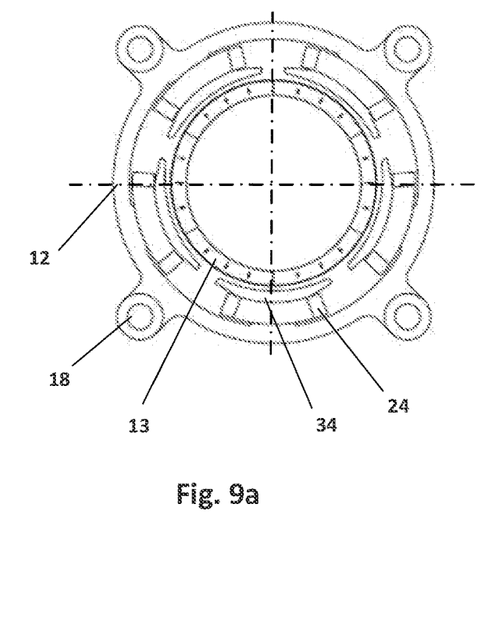
FIG. 9a, 9b are a schematic representation of a disc rotor in a second embodiment.
Figure 9B:
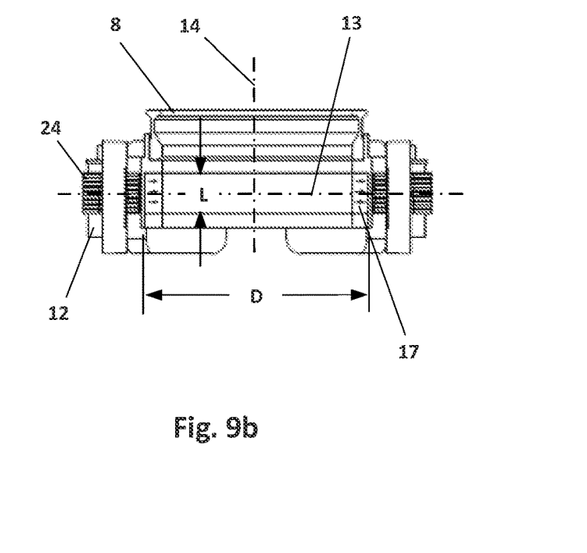
Figure 10:
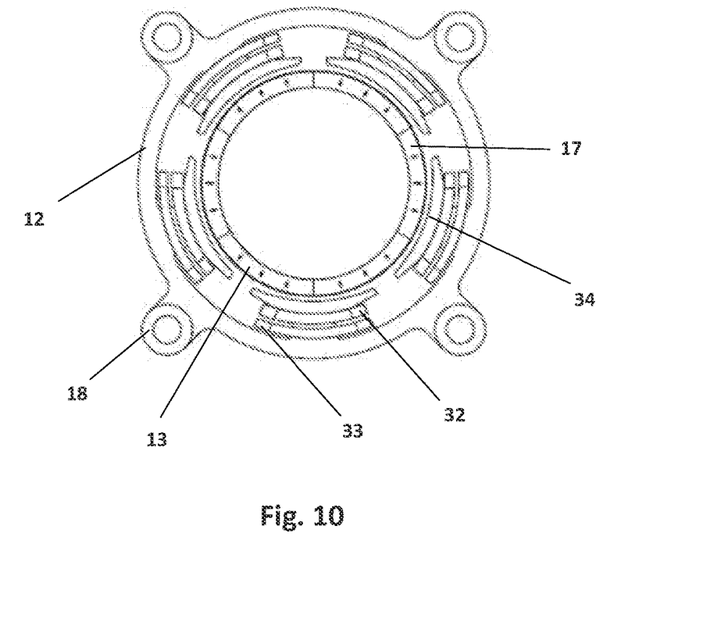
FIG. 10 is a schematic representation of a disc rotor in a third embodiment.

An embodiment with a number of strands of 5 and 5 concentric coils is shown in FIG. 9. As described, each coil has two current components: a force-current component for radially mounting the rotor and a torque-current component for driving and braking the rotor. An alternative embodiment is shown in FIG. 10. There is a separate coil for the force-current component and for the torque-current component. In comparison to FIG. 9, this embodiment has the disadvantage that more electronic components (usually power semiconductors) are required to control the coils.

The drive is advantageously designed as a bearingless disc rotor with a flat stator and a ratio of an axial length of the magnet of the rotor to a diameter of the magnet of the rotor is less than 0.4. The specification of the axial length and diameter refers to the magnet of the rotor and not to the external dimensions of the entire rotor structure. A geometric variable that has a decisive influence on the passive stability of the rotor is the axial length or rather the ratio of the axial length to the diameter of the rotor disc or the magnet thereof. Since the change in the axial length also changes the maximum magnetic air gap flux of a pole pitch, a change in length also affects the actively stabilized degrees of freedom, i.e. the load capacity and motor torque. Only the amplitudes of force and torque are changed, not their course as a function of the rotor angle. For this reason, a change in the axial length must be taken into account when designing the bearing and motor with regard to the size of the achievable force and torque. With respect to the passive stabilization of the axial and tilting movements of the rotor, a preferred ratio of the axial length to the diameter of the magnet of the rotor is 0.3, or is specified as the reciprocal of diameter to length 3.

In an alternative embodiment to the bearingless disc rotor having a flat stator, the drive is designed as a bearingless disc rotor with a stator in temple shape, in which, in this embodiment as well, a ratio of an axial length of the magnet of the rotor to a diameter of the magnet of the rotor is less than 0.4. In this case, too, the specification of the axial length and diameter relates to the magnet of the rotor and not to the external dimensions of an entire rotor structure. The advantages of a drive with a stator in temple shape can be seen in the fact that the entire drive has a smaller outer diameter than the disc rotor with a flat stator. This means that less space is required between the individual drives used in a ring-spinning machine, as a result of which the spinning positions can be assembled more closely and, for example, existing machines can easily be retrofitted with a ring according to the invention.

The ring traveler is preferably provided for contact on the ring crown in a free-moving manner. In this version, the ring traveler is dragged along the ring crown by the yarn. Due to the driven ring, a maximum differential speed can now be maintained between the ring crown and the ring traveler, although the ring traveler, in relation to the ring rail, can be operated at a much higher speed than in the case of a stationary ring.

In an alternative embodiment to a freely movable ring traveler, the ring traveler is provided for contact on the ring crown in a stationary manner. In this embodiment, the ring traveler is not dragged along by the yarn independently of a movement of the ring crown. The rotation of the ring traveler is determined solely by the rotation of the spinning ring and thus of the rotor of the drive. In a preferred embodiment, the ring traveler and the ring crown are designed in one piece.

An additional active magnetic bearing can advantageously be provided for the stabilization of the axial degree of freedom of the rotor. The stiffness and damping relevant for the axial vibration can be adjusted by means of an active axial magnetic bearing. As a result, the stability of the axial vibration can be increased, i.e. the maximum axial deflection of the rotor can be reduced. In addition, the rotor can be held in specific axial positions. The magnetic bearing contains a corresponding sensor in order to be able to actively regulate the axial position.

Preferably, a damping of the tilting vibrations is provided by means of a compensation means, the compensation means having at least one electrical conductor loop separated from a winding. The use of such compensation means is known from the disclosure of EP 3 255 760 A1. The electrical conductor loop separated from the winding is concatenated, on the one hand, to the exciter magnetic field in a reference position of the axis of rotation in a concatenation-free manner and, on the other hand, to the exciter magnetic field in an actual position of the axis of rotation that is tilted relative to the reference position in order to counteract the tilting. The mode of action corresponds to the effect of an electrodynamic damper with the particular advantage that the damping effect increases with increasing speed.

An emergency bearing is advantageously provided, the emergency bearing being formed from at least one sliding ring fastened to the stator. The emergency bearing is made of a material with sliding properties, such as PTFE, and is used to hold the rotor in the correct position when the drive is de-energized. If forces act on the rotor that are higher than the forces of the magnetic bearing, the emergency bearing ensures that the rotor remains within the stator. For this reason, it is common to provide an emergency bearing both in the radial direction and in the axial direction. In the event of a power failure, the DC voltage intermediate circuit is usually still supplied with electrical power through recuperation, i.e. targeted braking of the rotor, which means that the active radial magnetic bearing can continue to function properly. If the rotor speed falls below a specific limit speed, recuperation is no longer possible and the rotor falls into the radial emergency bearing.

Only specific combinations of the number of magnetic poles of the magnet of the rotor and the number of strands of the stator are suitable for operation as a bearingless motor. The minimum number of strands is 4. In the number of strands range of 4 to 6 and pole range of 2-10, the following embodiments are possible:

4 strands/4 poles
5 strands/2 poles
5 strands/6 poles
4 strands/4 poles
6 strands/2 poles
6 strands/6 poles
6 strands/8 poles If the number of strands corresponds to the number of poles, the motor has a single-phase characteristic. This means that the motor torque becomes zero at specific angles of rotation of the rotor. However, this property does not fundamentally exclude the use of such a topology.

If the number of poles divided by two is an even number, the compensation means described in EP 3 255 760 A1 is not effective.

It has been found that it is advantageous if the magnet of the rotor has 6 poles and the stator has 4 to 6 strands. In an alternative embodiment, the magnet of the rotor has 4 poles and the stator has 4 strands.

Furthermore, a ring-spinning machine having a ring rail is proposed with at least one driven ring as described above fastened to the ring rail. The stator is fastened to the ring rail, for example by clamping or screwing. In the ring rail, an opening for the spindle is provided which is configured so as to be concentric with the opening of the rotor. For an exact positioning of the drive or the ring, gauges or positioning aids attached to the ring rail can be used.

Advantageously, a damping of the bearing of the driven ring is provided by a damping element made of viscoelastic materials in the fastening means of the stator on the ring rail. The arrangement of a damping in the fastening means has the advantage that, on the one hand, vibrations of the rotor which are transmitted to the stator are converted into heat in the damping element and, on the other hand, external vibrations are not transmitted to the rotor. Typically, damping elements made of butyl-based rubber are used in this case.

A ring-twisting machine with at least one rubbed ring as described above is also claimed.

BRIEF DESCRIPTION OF THE DRAWINGS

The invention is explained in more detail below by means of drawings, in which.

DETAILED DESCRIPTION

In the following description of the alternative exemplary embodiments represented in the figures, the same reference signs are utilized for features that are identical or at least comparable in terms of their configuration and/or mode of operation. Provided the features are not described in detail again, their design and/or mode of operation correspond/corresponds to the design and mode of operation of the above-described features. For the sake of greater clarity, reference signs for previously described components have not been individually included in the figures.

Figure 1:
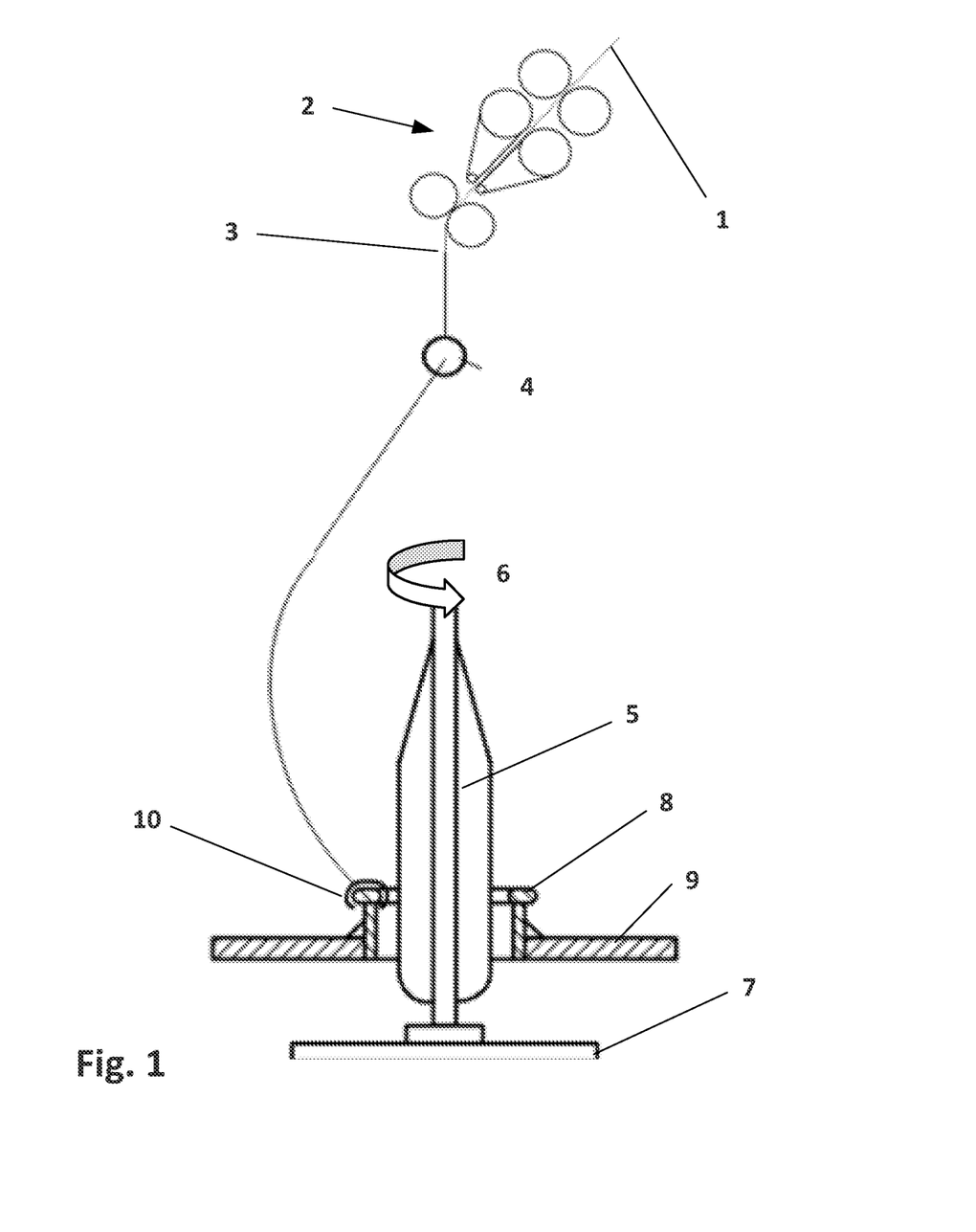
FIG. 1 is a schematic representation of a ring-spinning machine.

FIG. 1 shows a schematic representation of a spinning position of a ring-spinning machine, with today's ring spinning machines having up to 2,000 such spinning positions. In the ring-spinning machine, a fiber structure, a so-called sliver 1, is fed to a drafting system 2. The sliver 1 is drawn into a thread 3 by the drafting system 2. The drafting system 2 shown is a so-called apron drafting system, which is usually used for cotton. Many types of drafting systems 2 are known from the prior art, depending on the application. Downstream of the drafting system 2, the thread 3 is guided to a ring traveler 10 via a thread guide 4. After passing the ring traveler 10, the thread 3 is wound onto the bobbin 5. The bobbin 5 is set in rotation 6 by a drive 7. As a result of this rotation 6 of the bobbin 5, the ring traveler 10 is carried along by the thread 3, which means that the thread 3 is given a twist and the yarn is thus formed. Because the ring traveler 10 is held on the spinning ring 8, the ring traveler 10 is forced to revolve around the bobbin 5. The spinning ring 8 is held in a stationary manner on a ring frame 9.

Figure 2:
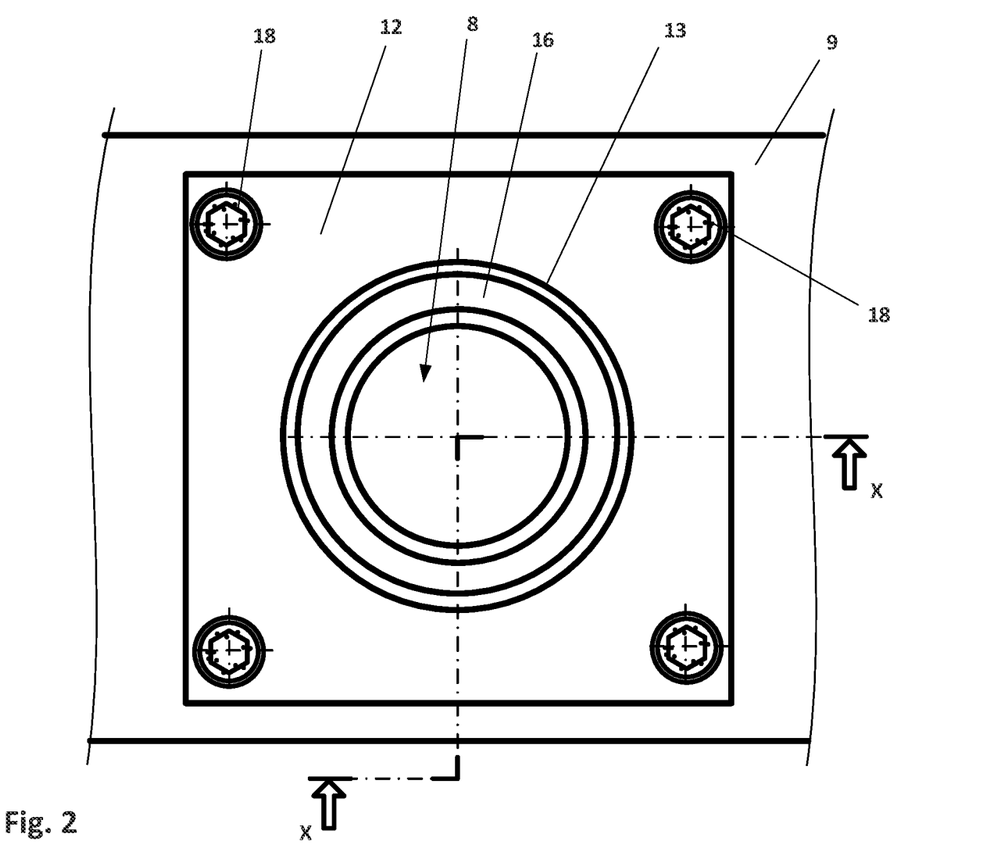
FIG. 2 is a schematic representation of a driven spinning ring according to the invention in a first embodiment.
Figure 3:
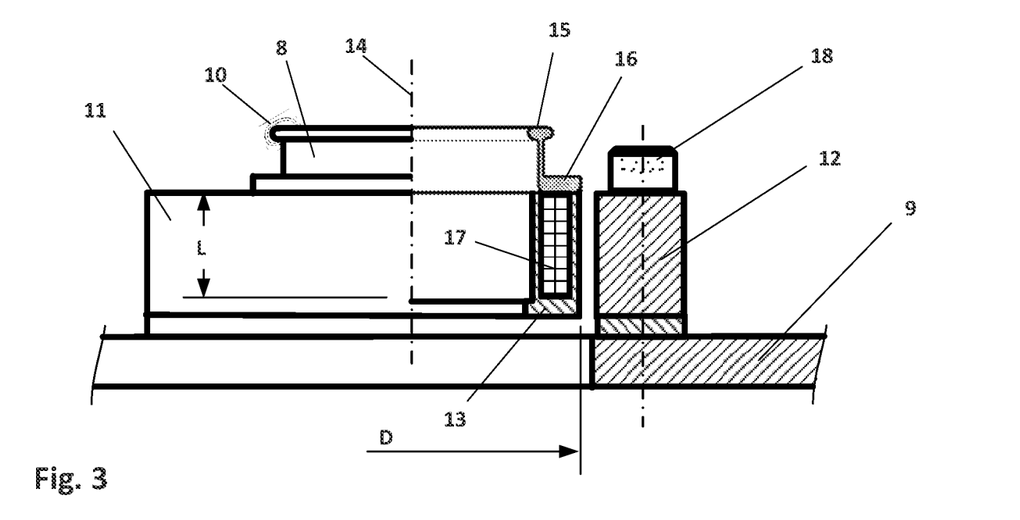
FIG. 3 is a schematic sectional view at point X-X of the embodiment according to FIG. 2.
Figure 5:
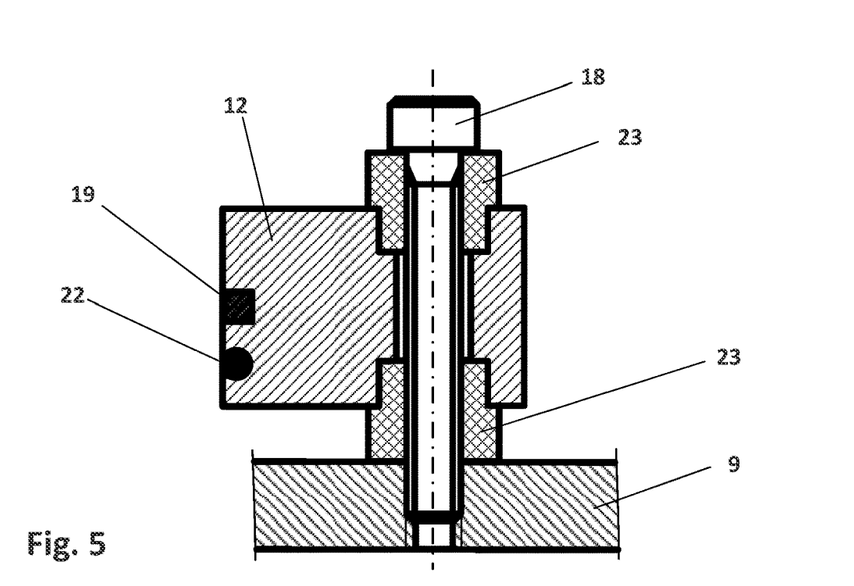
FIG. 5 is a schematic representation of a fastening means driven spinning ring on a ring rail.

FIG. 2 shows a schematic representation of a driven ring according to the invention in a first embodiment in a plan view and FIG. 3 shows a schematic sectional representation at point X-X of the embodiment according to FIG. 2. The stator 12 is fastened on a ring rail 9 using a fastening means 18. The stator 12 shown by way of example has a square shape and is held in a stationary manner in each of the corners thereof using a fastening means 18 in the form of a screw on the ring rail 9. A possible embodiment of this fastening means is shown in FIG. 5. A rotor 13 is arranged inside the stator 12, the stator 12 forming the drive 11 together with the rotor 13. The magnet 17 is connected to the rotor 13. The rotor 13 (respectively the magnet 17 thereof) has an axial length L and a diameter D. The magnet 17 has a number of poles of 4, 6 or 8, for example. The magnet 17 can be designed as a single ring or in segments. The stator 12 and the rotor 13 are arranged concentrically around an axis of rotation 14 of the spinning ring 8. A spinning ring 8 is also arranged concentrically to the drive 11; this is fastened to the rotor 13 in a stationary manner via a connecting portion 16. The spinning ring 8 has a ring crown 15 on which a ring traveler 10 is configured so as to be movable.

Figure 4:
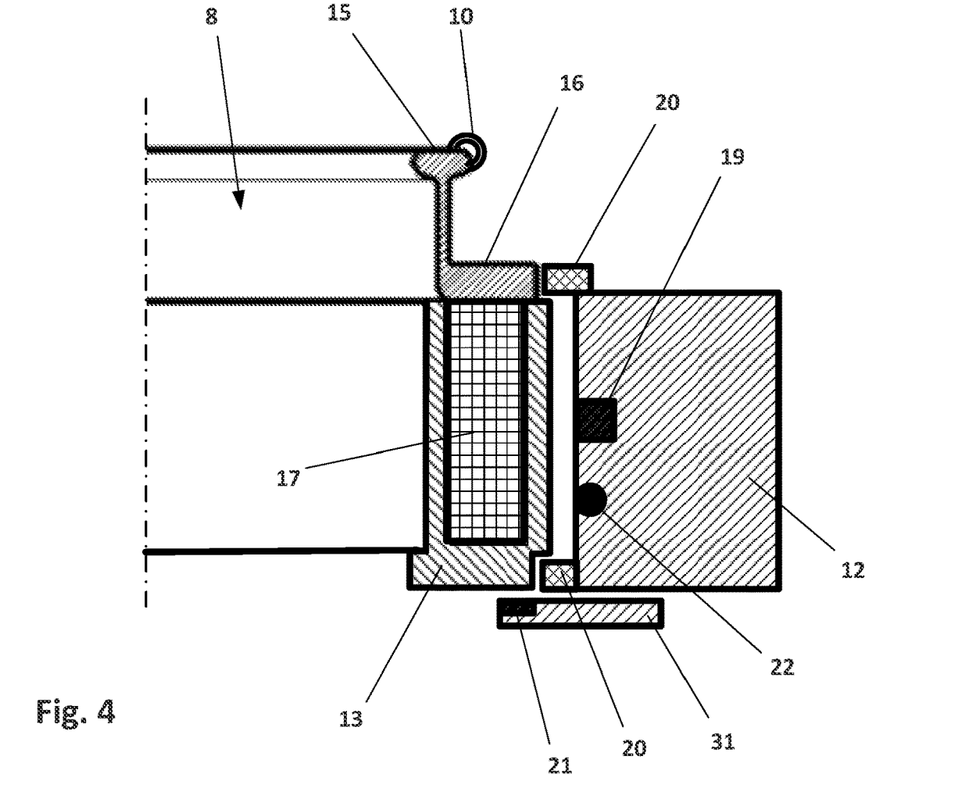
FIG. 4 is a schematic representation of a driven spinning ring according to the invention in a second embodiment.

FIG. 4 shows a schematic representation of a driven ring according to the invention in a second embodiment. The rotor 13 having magnets 17 and the stator 12 arranged around the rotor 13 are shown. A spinning ring 8 having a ring crown 15 and a connecting portion 16 is constructed on the rotor 13. The spinning ring 8 is connected to the rotor 13 in a stationary manner via the connecting portion 16. A ring traveler 10 is also fastened to the ring crown 15 in a stationary manner. As a result, the rotor 13 is set in rotation and the spinning ring 8 as well as the ring traveler 10 fastened thereto are also set in rotation by the rotor 13. In contrast to the representation in FIG. 3, the ring traveler 10 is not freely movable on the ring crown 15 but has the same speed at all times as the spinning ring 8 or the rotor 13.

The displacement sensor 22 for controlling the active radial magnetic bearing is embedded in the stator 12. The emergency bearings 20, which partially encompass the rotor 13 and are configured in the form of rings, are also fastened to the stator 12. The emergency bearings 20 act in the radial as well as in the axial direction. An additional axial magnetic bearing 31 with an associated axial displacement sensor 21 is also shown. A compensation means 19 in the form of a conductor loop is embedded in the stator 12.

FIG. 5 shows a schematic representation of a fastening means of the driven ring on a ring rail 9. The stator 12 equipped with a compensation means 19 and the radial displacement sensor 22 is provided with passage openings and the ring rail 9 is provided with correspondingly arranged internal threads. The passage openings have an enlarged diameter at their two ends to accommodate damping means 23. By means of the damping means 23, on the one hand, the stator 12 is decoupled from the ring rail 9 and, on the other hand, the stator 12 is decoupled from the fastening means 18. The fastening means 18 is exemplified by a screw. In the case of a screw in the embodiment shown, it is necessary to attach a damping means 23 to both screw ends since otherwise the vibrations would be transmitted from the ring rail 9 via the screw body to the stator 12 (or vice versa).

Figure 6A:
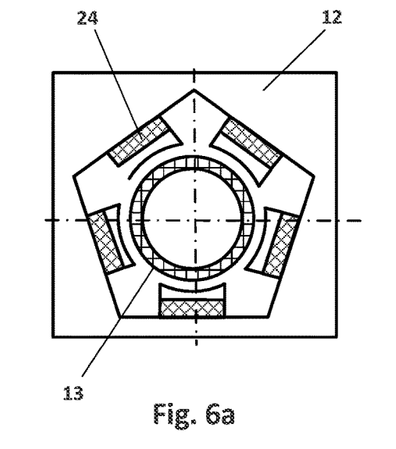
FIG. 6a, 6b are a schematic representation of a disc rotor with a flat stator in a first embodiment.
Figure 6B:
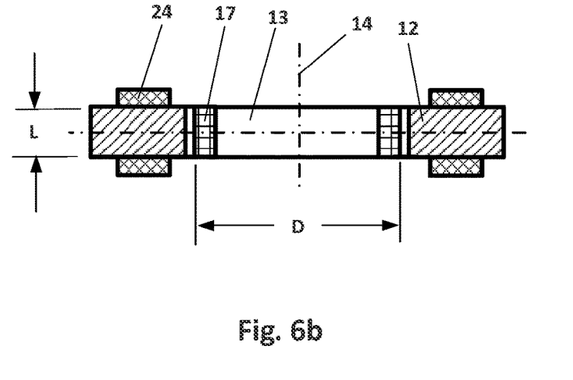

FIGS. 6a and 6b show a schematic representation of a so-called bearingless disc rotor in a first embodiment. A plan view and a cross section of the disc rotor with a flat stator 12 are shown. The rotor 13 is arranged inside the stator 12 and the magnet 17 thereof has an axial length L and a diameter D. The rotor 13 and the stator 12 are arranged concentrically around the axis of rotation 14. The magnets 17 are shown schematically on the rotor 13, the number of poles not being shown in the representation. The stator 12 is shown as a laminated core with windings 24 facing the rotor 13 in five strands.

Figure 7A:
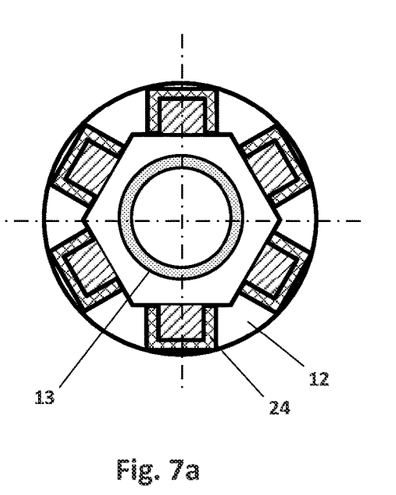
FIG. 7a, 7b are a schematic representation of a disc rotor with a stator in temple shape.
Figure 7B:
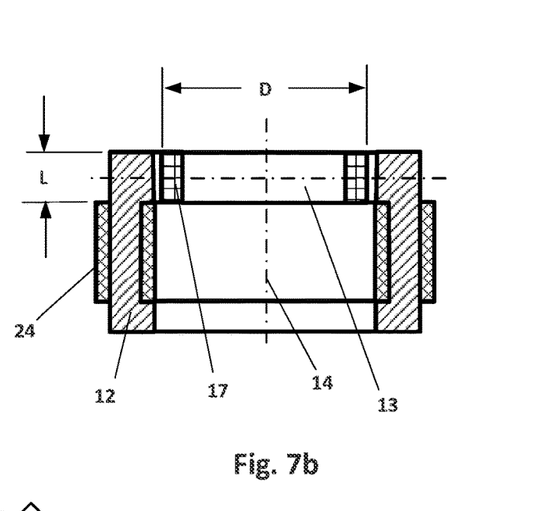

FIGS. 7a and 7b are a schematic representation of a disc rotor with a stator 12 in temple shape. A plan view and a cross section of the disc rotor are shown. The design of the rotor 13, with the magnets 17 and the axial length L and diameter D thereof, corresponds to the rotor 13 according to FIGS. 6a and 6b. In this embodiment, too, the stator 12 and the rotor 13 are arranged concentrically around the axis of rotation 14. The laminated core of the stator 12 is, however, provided with a greater axial extent than the rotor 13, so that the windings 24, shown in this case as six strands, are arranged in an axial displacement along the axis of rotation 14 with respect to the rotor 13.

Figure 8:
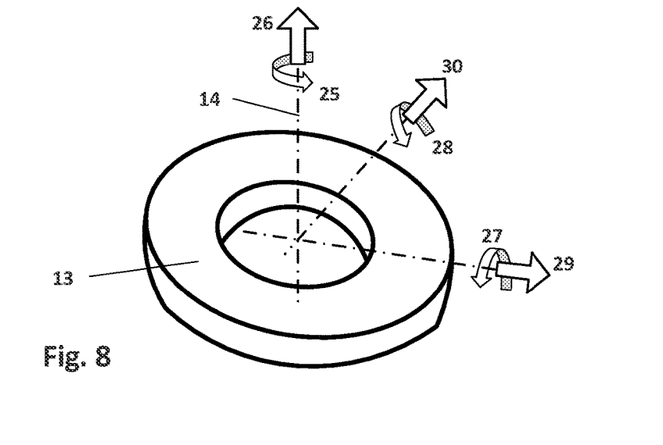
FIG. 8 is a schematic representation of the degrees of freedom.

FIG. 8 is a schematic representation of the degrees of freedom. For the sake of simplicity, the rotor 13 is shown as a cylindrical ring. A rotation of the rotor 13 about the axis of rotation 14 takes place, the rotational degree of freedom 25 being indicated. For all direction specifications in FIG. 8, however, the direction specifications also include the specification about an opposite direction. The two tilting degrees of freedom 27 and 28 as well as an axial degree of freedom 26 and both radial degrees of freedom 29 and 30 are also indicated.

FIGS. 9a and 9b show a schematic representation of a disc rotor in a second embodiment. A plan view and a cross section of the disc rotor are shown. The rotor 13 is arranged inside the stator 12 and the magnet 17 thereof has an axial length L and a diameter D. The spinning ring 8 is fastened to the rotor 13. The rotor 13 and the stator 12 are arranged concentrically around the axis of rotation 14. Four fastening means 18 are provided on the stator 12. The magnets 17 are shown schematically on the rotor 13, a number of poles of six poles being visible in the plan view. The stator 12 is provided with five teeth 34 on each of which a winding 24 is attached, resulting in five strands.

FIG. 10 shows a schematic representation of a disc rotor in a third embodiment in a plan view. The rotor 13 is arranged inside the stator 12. The rotor 13 and stator 12 are arranged concentrically. Four fastening means 18 are provided on the stator 12. The magnets 17 are shown schematically on the rotor 13, a number of poles of six poles being visible in the plan view. The stator 12 is provided with five teeth 34, resulting in five strands. The windings in the form of coils are attached to the teeth, each inner coil on the tooth 34 being designed as a radial force coil 32 and each outer coil on the tooth 34 being designed as a torque coil 33.

The present invention is not limited to the represented and described exemplary embodiments. Modifications within the scope of the claims are also possible, as is any combination of the described features, even if they are represented and described in different parts of the description or the claims or in different exemplary embodiments, provided no contradiction to the teaching of the independent claims results.

LIST OF REFERENCE SIGNS

1 Sliver
2 Drafting system
3 Thread
4 Thread guide
5 Bobbin
6 Rotation bobbin
7 Drive
8 Spinning ring
9 Ring frame
10 Ring traveler
11 Drive
12 Stator
13 Rotor
14 Axis of rotation spinning ring
15 Ring crown
16 Connecting portion
17 Magnet
18 Fastening means
19 Compensation means
20 Emergency bearing
21 Axial displacement sensor
22 Radial displacement sensor
23 Damping element
24 Winding
25 Rotational degree of freedom
26 Axial degree of freedom
27 Tilting degree of freedom
28 Tilting degree of freedom
29 Radial degree of freedom
30 Radial degree of freedom
31 Axial magnetic bearing
32 Radial force coil
33 Torque coil
34 Tooth of the stator
D Diameter rotor
L Axial length rotor

The invention claimed is:

1. A driven ring assembly for a ring-spinning or ring-twisting machine, comprising:
   a ring;
   an electric drive comprising a stator and a rotor, the rotor comprising a magnet;
   a ring crown on the ring, and a ring traveler in contact with the ring crown;
   a connecting portion between the ring and the rotor;
   the electric drive further comprising coil winding strands in the stator that generate a torque and radial forces; and
   the electric dive configured such that an axial degree of freedom and tilting degrees of freedom of the rotor are passively stabilized by reluctance forces and radial degrees of freedom of the rotor are actively stabilized by control of current through the coil winding strands.

2. The driven ring assembly according to claim 1, wherein the rotor is a disc rotor and the stator is a flat stator, and wherein a ratio of an axial length (L) of the magnet to a diameter (D) of the magnet is less than 0.4.

3. The driven ring assembly according to claim 1, wherein the stator comprises a temple shape, and a ratio of an axial length (L) of the magnet to a diameter (D) of the magnet being less than 0.4.

4. The driven ring assembly according to claim 1, wherein the ring traveler is provided in a free-moving manner on the ring crown.

5. The driven ring assembly according to claim 1, wherein the ring traveler is provided in a fixed stationary manner on the ring crown.

6. The driven ring assembly according to claim 5, wherein the ring traveler and the ring crown are formed as one piece.

7. The driven ring assembly according to claim 1, further comprising an additional active magnetic bearing located to stabilize axial degrees of freedom of the rotor.

8. The driven ring assembly according to claim 1, further comprising a conductor loop in the stator separated from coil windings to dampen tilting vibrations.

9. The driven ring assembly according to claim 1, further comprising an emergency bearing comprising at least one sliding ring fastened to the stator.

10. The driven ring assembly according to claim 1, wherein the magnet comprises six poles and the stator comprises five winding strands.

11. The driven ring assembly according to claim 1, wherein the magnet comprises six poles and the stator comprises from four to six winding strands.

12. The driven ring assembly according to claim 1, wherein the magnet comprises four poles and the stator comprises four winding strands.

13. A ring-spinning machine, comprising a ring rail and at least one driven ring assembly according to claim 1.

14. The ring-spinning machine according to claim 13, wherein the stator is fastened to the ring rail with a viscoelastic damping element.

15. A ring-twisting machine, comprising a ring rail and at least one driven ring assembly according to claim 1.

* * * * *